US012412961B2

(12) United States Patent
Kamiyama et al.

(10) Patent No.: US 12,412,961 B2
(45) Date of Patent: Sep. 9, 2025

(54) SQUARE SECONDARY BATTERY (71) Applicant: SANYO Electric Co., Ltd., Kadoma (JP)

(72) Inventors: Yuma Kamiyama, Osaka (JP); Ryoichi Wakimoto, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 342 days.

(21) Appl. No.: 17/791,328

(22) PCT Filed: Jan. 19, 2021

(86) PCT No.: PCT/JP2021/001683
§ 371 (c)(1),
(2) Date: Jul. 7, 2022

(87) PCT Pub. No.: WO2021/161738
PCT Pub. Date: Aug. 19, 2021

(65) Prior Publication Data
US 2023/0352799 A1 Nov. 2, 2023

(30) Foreign Application Priority Data

Feb. 13, 2020 (JP) .................. 2020-022465

(51) Int. Cl.
*H01M 50/474* (2021.01)
*H01M 50/103* (2021.01)
(Continued)

(52) U.S. Cl.
CPC ....... *H01M 50/474* (2021.01); *H01M 50/103* (2021.01); *H01M 50/15* (2021.01);
(Continued)

(58) Field of Classification Search
CPC ......... H01M 10/0431; H01M 10/0468; H01M 50/103; H01M 50/15; H01M 50/474;
(Continued)

(56) References Cited

U.S. PATENT DOCUMENTS

2013/0052500 A1  2/2013  Nonaka et al.
2015/0287966 A1  10/2015  Jeong
(Continued)

FOREIGN PATENT DOCUMENTS

CN      107534115 A    1/2018
JP      2013-54821 A   3/2013
(Continued)

OTHER PUBLICATIONS

International Search Report dated Apr. 6, 2021, issued in counterpart International Application No. PCT/JP2021/001683, w/English translation (5 pages).
(Continued)

Primary Examiner — Lingwen R Zeng
(74) Attorney, Agent, or Firm — WHDA, LLP (57) ABSTRACT A secondary battery includes a battery case housing a flat electrode body and a sealing plate. The electrode body is housed in the battery case such that a winding axis thereof is parallel with a longitudinal direction of the sealing plate. At an end portion of the electrode body in a winding axis direction thereof, an edge of a positive or negative electrode plate is connected to an external terminal fixed to the sealing plate through a current collector. An insulating pressing member is arranged between the sealing plate and the electrode body. The pressing member presses the electrode body in a direction perpendicular to the winding axis such that a distance between a portion of the electrode body contacting the pressing member and the sealing plate is
(Continued)

longer than a distance between the end portion of the electrode body in the winding axis direction thereof and the sealing plate.

6 Claims, 8 Drawing Sheets

(51) Int. Cl.
*H01M 50/15* (2021.01)
*H01M 50/486* (2021.01)
*H01M 50/538* (2021.01)
*H01M 10/04* (2006.01)
*H01M 50/477* (2021.01)

(52) U.S. Cl.
CPC ....... *H01M 50/486* (2021.01); *H01M 50/538* (2021.01); *H01M 10/0431* (2013.01); *H01M 10/0468* (2013.01); *H01M 50/477* (2021.01); *Y02E 60/10* (2013.01); *Y02P 70/50* (2015.11)

(58) Field of Classification Search
CPC ............. H01M 50/477; H01M 50/486; H01M 50/538; Y02E 60/10; Y02P 70/50
See application file for complete search history.

(56) References Cited

U.S. PATENT DOCUMENTS

2015/0357670 A1* 12/2015 Yamafuku ........... H01M 50/477
429/94
2018/0097207 A1 4/2018 Unno et al.

FOREIGN PATENT DOCUMENTS

| | | |
|---|---|---|
| JP | 2015-49959 A | 3/2015 |
| JP | 2015-049959 A | 3/2015 |
| JP | 2015-232941 A | 12/2015 |
| WO | 2016/185867 A1 | 11/2016 |

OTHER PUBLICATIONS

Office Action dated Oct. 18, 2022, issued in counterpart IN Application No. 202247035579, with English Translation. (5 pages).
Extended Supplementary European Search Report dated Sep. 27, 2024, issued in counterpart Application No. 21754346.1. (9 pages).
Chinese Search Report dated Mar. 29, 2025, issued in counterpart CN Application No. 202180012124.X, with English Translation. (5 pages).

* cited by examiner

SQUARE SECONDARY BATTERY

TECHNICAL FIELD

The present disclosure relates to a rectangular secondary battery configured such that a flat electrode body is housed in a rectangular battery case.

BACKGROUND ART

A secondary battery such as a lithium ion secondary battery has a structure in which an electrode body configured such that a positive electrode plate and a negative electrode plate are wound with a separator interposed therebetween is housed in a battery case together with an electrolytic solution.

Patent Document 1 discloses a rectangular secondary battery configured such that a flat electrode body is housed in a rectangular battery case with a winding axis of the electrode body being parallel with a longitudinal direction of a sealing plate. Edges of positive and negative electrode plates extending from both end portions (hereinafter merely referred to as "end portions") of the electrode body in a winding axis direction thereof are each connected to external terminals fixed to the sealing plate through current collectors. The sealing plate is provided with a gas discharge valve, and when the pressure of gas generated in the battery exceeds a predetermined value, the gas discharge valve is operated to release the gas to the outside of the battery.

CITATION LIST

Patent Document

PATENT DOCUMENT 1: Japanese Unexamined Patent Publication No. 2013-54821

SUMMARY OF THE INVENTION

In the rectangular secondary battery disclosed in Patent Document 1, the electrode body is housed in the battery case such that the winding axis thereof is parallel with the longitudinal direction of the sealing plate. Thus, gas generated by reaction with an electrolytic solution in the electrode body moves along the winding axis, and is discharged from the end portions of the electrode body to a space in the battery case.

Since both end portions of the electrode body are connected to the current collectors fixed to the sealing plate, these end portions are fixed by the current collectors. Thus, even when the volume of the negative electrode plate forming the electrode body expands due to charging and discharging, the positions of both end portions of the electrode body do not move. On the other hand, a center portion (hereinafter merely referred to as a "center portion") of the electrode body in a winding axis direction thereof is not fixed by the current collectors. For this reason, when the volume of the negative electrode plate expands, the center portion of the electrode body expands in a direction perpendicular to the winding axis. Thus, as a result of repeated charging and discharging of the secondary battery in a state in which the secondary battery is placed with the sealing plate positioned on the upper side, the center portion of the electrode body is positioned higher than both end portions of the electrode body.

Normally, gas generated by reaction with the electrolytic solution in the electrode body is lighter than the electrolytic solution. For this reason, gas generated at the center portion of the electrode body is less likely to be discharged from both end portions of the electrode body. As a result, gas which cannot be discharged from both end portions of the electrode body tends to be accumulated on the center portion of the electrode body.

Active materials are covered with the gas accumulated in the electrode body, and such active materials cannot be utilized. This leads to, e.g., capacity/power decline and lithium deposition. Particularly, in a battery increased in size, the length of an electrode body in the winding axis direction thereof is longer, and therefore, a gas discharge path is longer. Accordingly, the amount of gas accumulated in the electrode body is greater, and as a result, e.g., capacity/power decline and lithium deposition become more prominent.

A rectangular secondary battery according to the present disclosure includes a flat electrode body configured such that a positive electrode plate and a negative electrode plate are wound with a separator interposed therebetween, a rectangular battery case having an opening and housing the electrode body, and a sealing plate sealing the opening. The electrode body is housed in the battery case such that a winding axis of the electrode body is parallel with a longitudinal direction of the sealing plate. At an end portion of the electrode body in a winding axis direction thereof, an edge of the positive or negative electrode plate is connected to an external terminal fixed to the sealing plate through a current collector. An insulating pressing member contacting the sealing plate and the electrode body is arranged between the sealing plate and the electrode body. The pressing member presses the electrode body in a direction perpendicular to the winding axis of the electrode body such that a distance between a portion of the electrode body contacting the pressing member and the sealing plate is longer than a distance between the end portion of the electrode body in the winding axis direction thereof and the sealing plate.

According to the present disclosure, the rectangular secondary battery can be provided, which is configured so that capacity/power decline and lithium deposition due to deformation of the electrode body caused by expansion of the volume of the negative electrode plate can be reduced.

BRIEF DESCRIPTION OF THE DRAWINGS

FIGS. 1A to 1C are views schematically showing the configuration of a rectangular secondary battery in one embodiment of the present disclosure.

FIGS. 6A to 6D are views showing a variation of the present embodiment.

FIGS. 7A and 7B are views showing another variation of the present embodiment.

DESCRIPTION OF EMBODIMENTS

Hereinafter, an embodiment of the present disclosure will be described in detail based on the drawings. Note that the present invention is not limited to the following embodiment. Moreover, changes can be made as necessary without departing from a scope in which the advantageous effects of the present invention are provided.

Figure 1A:
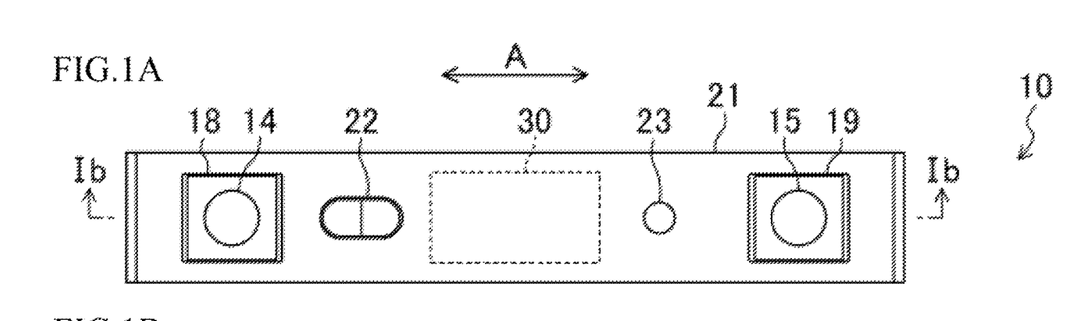
FIG. 1A is a plan view.
Figure 1B:
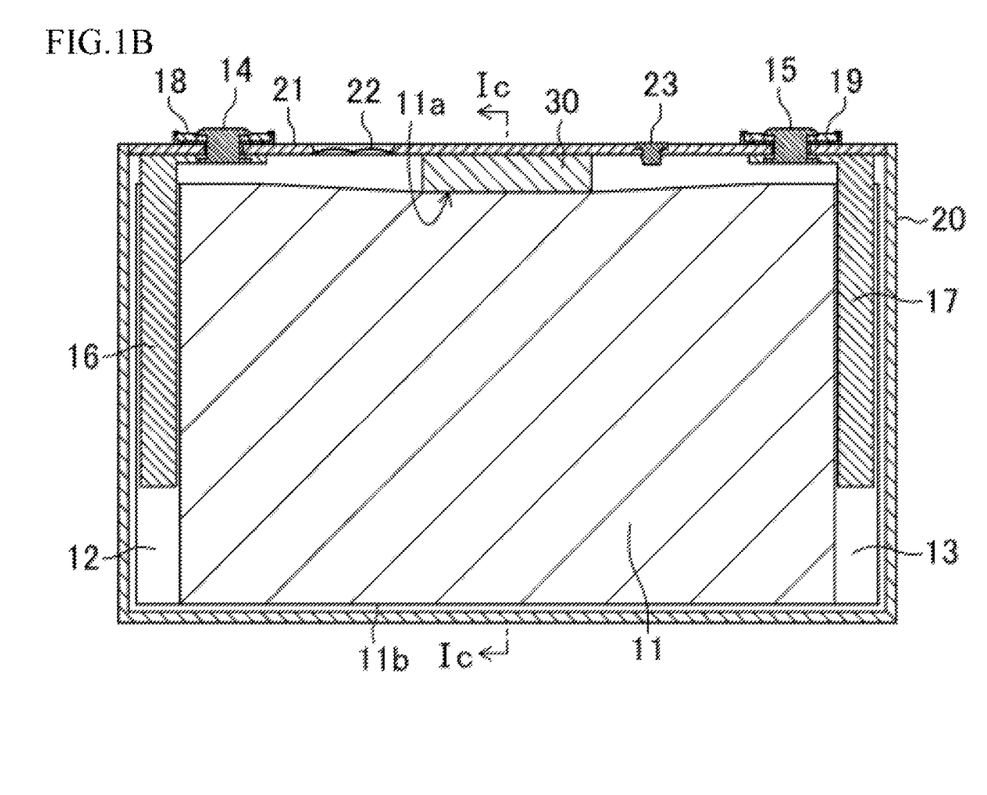
FIG. 1B is a sectional view along an Ib-Ib line of FIG. 1A.
Figure 1C:
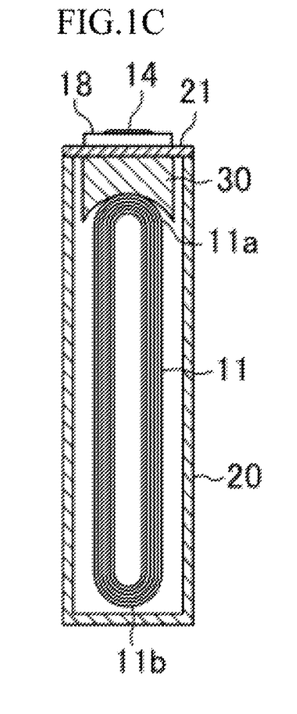
FIG. 1C is a sectional view along an Ic-Ic line of FIG. 1B.

FIGS. 1A to 1C are views schematically showing the configuration of a rectangular secondary battery in one embodiment of the present disclosure. FIG. 1A is a plan view, FIG. 1B is a sectional view along an Ib-Ib line of FIG. 1A, and FIG. 1C is a sectional view along an Ic-Ic line of FIG. 1B. The rectangular secondary battery in the present embodiment is a battery using a "non-aqueous" electrolyte such as an organic electrolyte/solvent, and the type thereof is not particularly limited. Representative examples of the non-aqueous electrolyte secondary battery include a lithium ion secondary battery.

As shown in FIGS. 1A to 1C, the rectangular secondary battery 10 in the present embodiment includes an electrode body 11, a rectangular battery case 20 housing the electrode body 11, and a sealing plate 21 sealing an opening of the battery case 20. The electrode body 11 has a flat structure in which a positive electrode plate and a negative electrode plate are wound with a separator interposed therebetween. The electrode body 11 is housed in the battery case 20 such that a winding axis (the right-left direction as viewed in the figure) of the electrode body 11 is parallel with a longitudinal direction A of the sealing plate 21.

At end portions (hereinafter merely referred to as "end portions") 12, 13 of the electrode body 11 in a winding axis direction thereof, edges of the positive and negative electrode plates are each connected to positive and negative electrode external terminals 14, 15 fixed to the sealing plate 21 through positive and negative electrode current collectors 16, 17. The edges of the positive and negative electrode plates are regions to which no positive and negative electrode active materials are applied.

The positive and negative electrode external terminals 14, 15 are fixed to the sealing plate 21 through insulating plates 18, 19. With this configuration, the positive and negative electrode external terminals 14, 15 are electrically insulated from the sealing plate 21. The sealing plate 21 is provided with a gas discharge valve 22. The gas discharge valve 22 releases gas from the battery when the internal pressure of the battery case 20 has increased to a predetermined value or more. The sealing plate 21 is provided with a solution injection hole, and the solution injection hole is sealed with a plug 23 after the electrolytic solution has been injected into the battery case 20 through the solution injection hole.

In the present embodiment, an insulating pressing member 30 contacting the sealing plate 21 and the electrode body 11 is arranged between the sealing plate 21 and the electrode body 11. The pressing member 30 is arranged at a center portion (hereinafter merely referred to as a "center portion") of the electrode body 11 in the winding axis direction thereof.

The pressing member 30 presses the center portion of the electrode body 11 in a direction (a downward direction as viewed in the figure) perpendicular to the winding axis of the electrode body 11. With this configuration, a distance between a portion 11a of the electrode body 11 contacting the pressing member 30 and the sealing plate 21 is longer than a distance between the end portion 12, 13 of the electrode body 11 and the sealing plate 21. That is, when the rectangular secondary battery 10 is placed in a state in which the sealing plate 21 provided with the gas discharge valve 22 is positioned on the upper side, the sealing-plate-21-side (the upper side as viewed in the figure) end portion 11a of the electrode body 11 at the center portion thereof is positioned lower than sealing-plate-21-side end portions of the end portions 12, 13 of the electrode body 11. Since the end portion 11a of the electrode body 11 is pressed by the pressing member 30 and is maintained in a bent state, the position of the end portion 11a does not change even when the volume of the negative electrode plate expands.

Figure 2A:
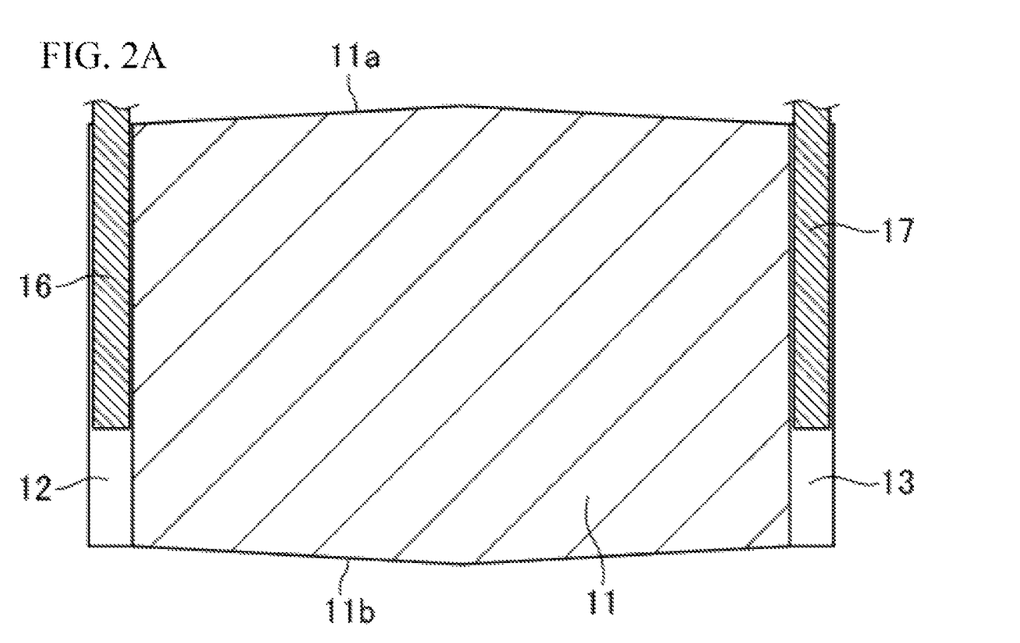
FIGS. 2A and 2B are views for describing features and advantageous effects in the present embodiment.
Figure 2B:
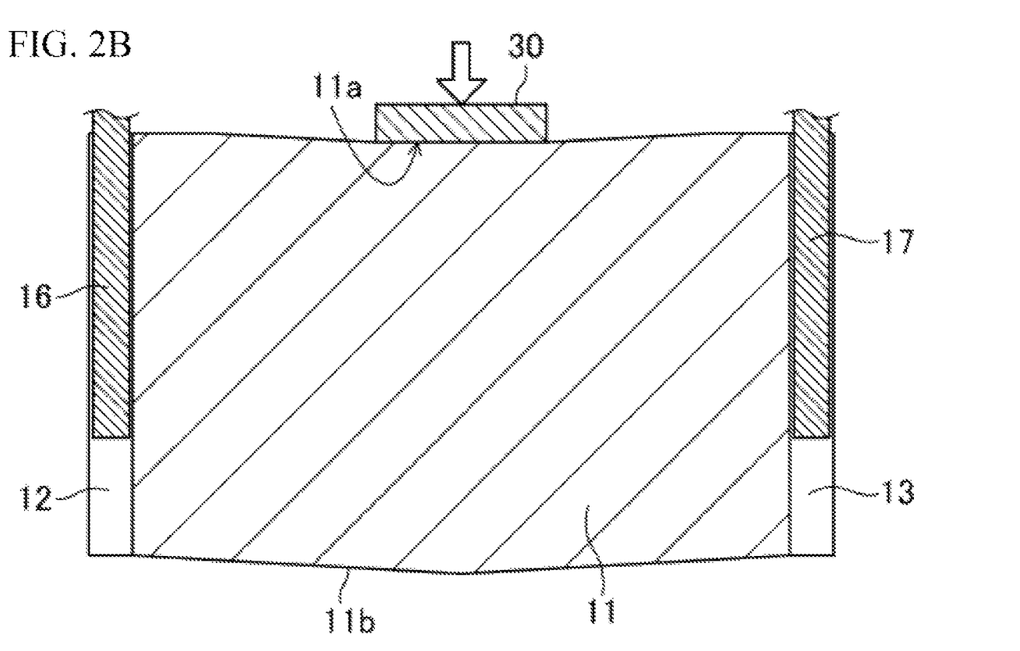

Next, features and advantages effects in the present embodiment will be described with reference to FIGS. 2A and 2B. FIGS. 2A and 2B do not show the battery case 20, the sealing plate 21, etc., and show only the electrode body 11 and the current collectors 16, 17. FIG. 2A shows a case where no pressing member 30 is arranged between the sealing plate 21 and the electrode body 11, and FIG. 2B shows a case where the pressing member 30 is arranged between the sealing plate 21 and the electrode body 11.

In the case where no pressing member 30 is arranged between the sealing plate 21 and the electrode body 11 as shown in FIG. 2A, the positions of both end portions 12, 13 of the electrode body 11 do not move even when the volume of the negative electrode plate forming the electrode body 11 expands because both end portions 12, 13 of the electrode body 11 are fixed by the current collectors 16, 17 fixed to the sealing plate 21.

On the other hand, since the center portion of the electrode body 11 is not fixed by the current collectors 16, 17, the center portion of the electrode body 11 expands in the direction (the up-down direction as viewed in the figure) perpendicular to the winding axis when the volume of the negative electrode plate expands. For this reason, as a result of repeated charging and discharging in a state in which the rectangular secondary battery 10 is placed with the sealing plate 21 positioned on the upper side, the sealing-plate-21-side (the upper side as viewed in the figure) end portion 11a of the electrode body 11 at the center portion thereof is positioned higher than the sealing-plate-21-side end portions of the end portions 12, 13 of the electrode body 11.

Normally, gas generated by reaction with the electrolytic solution in the electrode body 11 is lighter than the electrolytic solution. For this reason, gas generated at the sealing-plate-21-side (the upper side as viewed in the figure) end portion 11a of the electrode body 11 at the center portion thereof is less likely to be discharged from the end portions 12, 13 of the electrode body 11. As a result, gas which cannot be discharged from the end portions 12, 13 of the electrode body 11 tends to be accumulated on the center portion of the electrode body 11.

The active materials are covered with the gas accumulated in the electrode body 11, and such active materials cannot be utilized. This leads to, e.g., capacity/power decline and lithium deposition. Particularly, in a battery increased in size, the length of an electrode body 11 in the winding axis direction thereof is longer, and therefore, a gas discharge path is longer. Accordingly, the amount of gas accumulated in the electrode body 11 is greater, and as a result, e.g., capacity/power decline and lithium deposition become more prominent.

On the other hand, in the case where the pressing member 30 is arranged between the sealing plate 21 and the electrode body 11 as shown in FIG. 2B, the sealing-plate-2I-side (the upper side as viewed in the figure) end portion 11a of the electrode body 11 at the center portion thereof is, as described above, positioned lower than the sealing-plate-2I-side end portions of the end portions 12, 13 of the electrode body 11 when the rectangular secondary battery 10 is placed with the sealing plate 21 positioned on the upper side.

Thus, gas generated at the sealing-plate-2I-side end portion 11a of the electrode body 11 at the center portion thereof is forcibly discharged toward the end portions 12, 13 of the electrode body 11 at the positions higher than the end portion Ia. With this configuration, gas accumulation on the center portion of the electrode body 11 can be reduced. As a result, capacity/power decline and lithium deposition due to deformation of the electrode body 11 caused by expansion of the volume of the negative electrode plate can be reduced.

Next, the steps of assembling the rectangular secondary battery in the present embodiment will be described with reference to FIGS. 3A, 3B, 4A, and 4B.

Figure 3A:
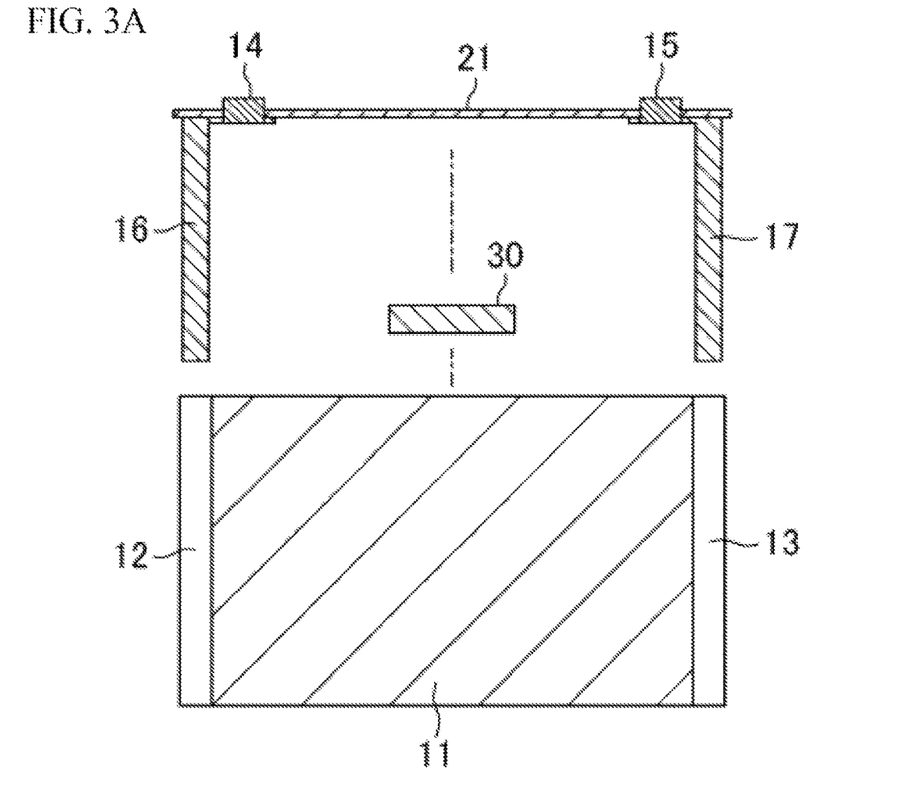
FIGS. 3A and 3B are views for describing the steps of assembling the rectangular secondary battery.

First, as shown in FIG. 3A, the sealing plate 21 to which the external terminals 14, 15 and the current collectors 16, 17 are attached, the pressing member 30, and the electrode body 11 are prepared.

Figure 3B:
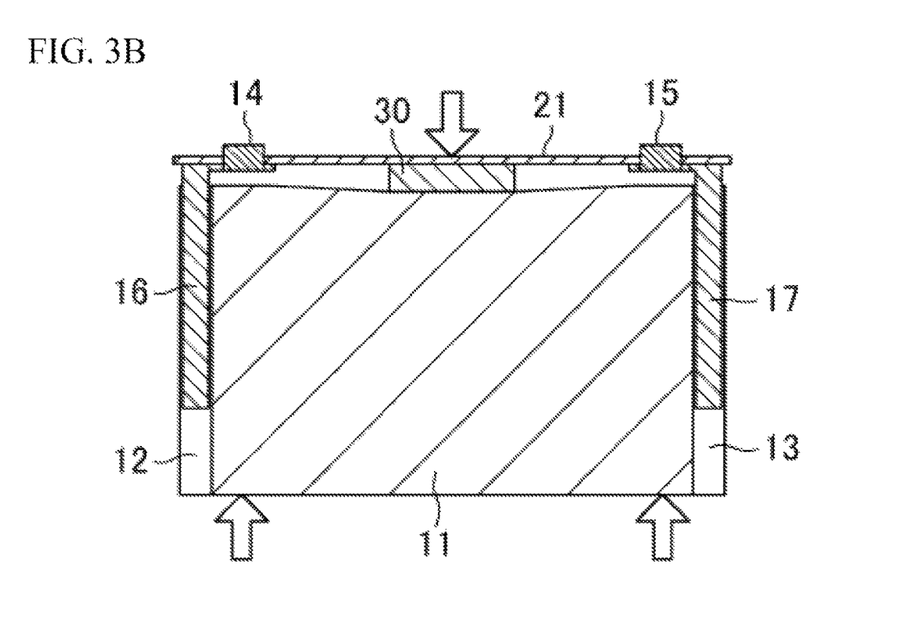

Next, as shown in FIG. 3B, the electrode body 11 is arranged such that the winding axis of the electrode body 11 is parallel with the longitudinal direction of the sealing plate 21, and thereafter, the pressing member 30 is sandwiched between the sealing plate 21 and the electrode body 11. Note that the pressing member 30 is arranged at the center portion of the electrode body 11. Thereafter, a center portion of the sealing plate 21 and both end portions 12, 13 of the electrode body 11 are pressed from the opposite directions, and accordingly, the portion of the electrode body 11 contacting the pressing member 30 is bent.

Figure 4A:
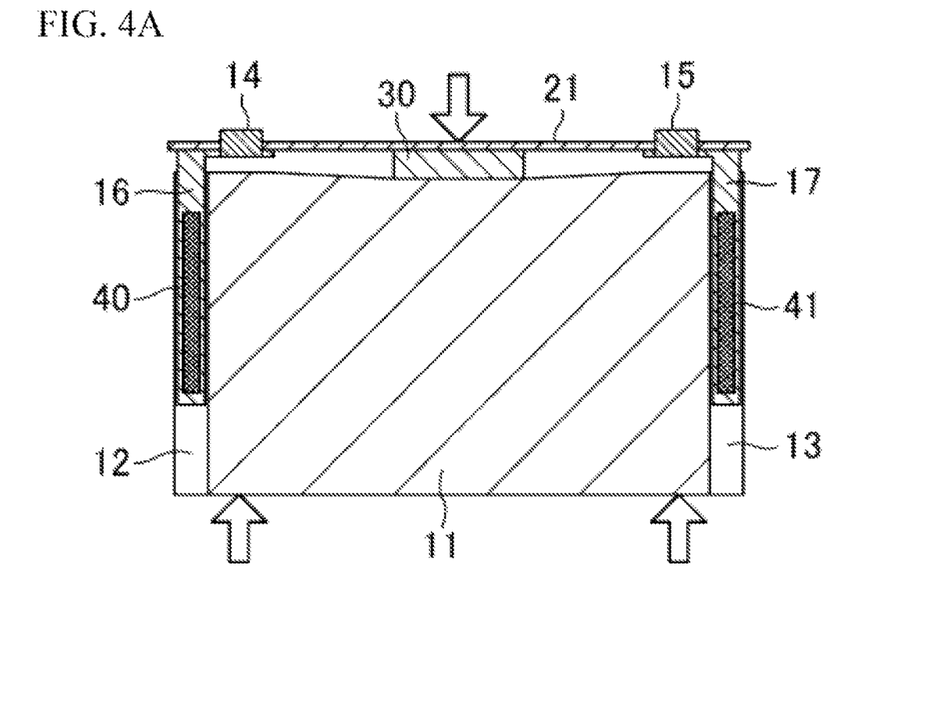
FIGS. 4A and 4B are views for describing the steps of assembling the rectangular secondary battery.

Next, as shown in FIG. 4A, while the bent state of the electrode body 11 is maintained, the current collectors 16, 17 are each welded to the end portions 12, 13 of the electrode body 11 at welding locations 40, 41.

Figure 4B:
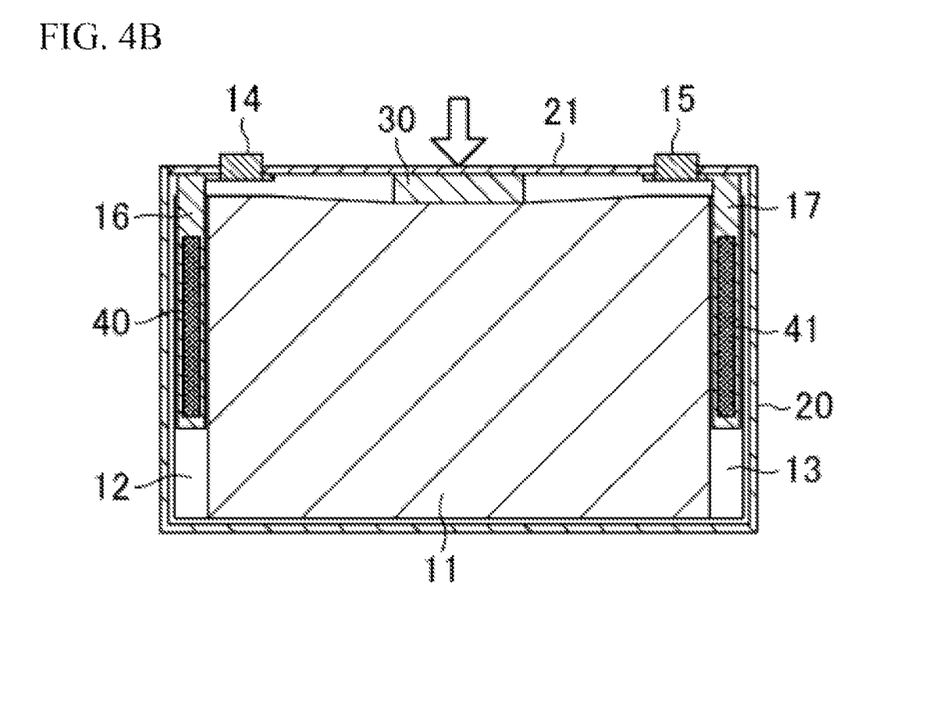

Next, as shown in FIG. 4B, the electrode body 11 attached to the sealing plate 21 is housed in the rectangular battery case 20, and thereafter, the sealing plate 21 is welded at the peripheral edge of the opening of the battery case 20. Note that the force of bending the sealing plate 21 acts from the electrode body 11 through the pressing member 30, and therefore, for avoiding bending of the sealing plate 21, the sealing plate 21 is preferably welded while the center portion of the sealing plate 21 is pressed.

The pressing member 30 arranged between the sealing plate 21 and the electrode body 11 receives reactive force from the pressed electrode body 11. Thus, the position of the pressing member 30 can be maintained without the need for fixing the pressing member 30 by the sealing plate 21, for example. The pressing member 30 may be fixed by the sealing plate 21, for example.

In the present embodiment, the material of the pressing member 30 is not particularly limited as long as the material has heat resistance even in the battery 10. Examples of the material to be used for the pressing member 30 may include resins such as polypropylene (PP) and polyethylene (PE) and rubbers such as polyvinylidene fluoride (PVDF) and styrene-butadiene copolymer (SBR).

Figure 5A:
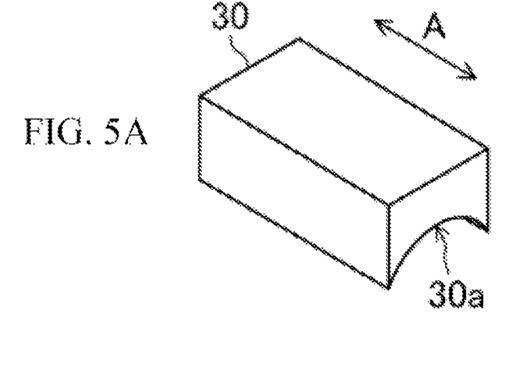
FIG. 5A is a perspective view showing a specific example of the shape of a pressing member.
Figure 5B:
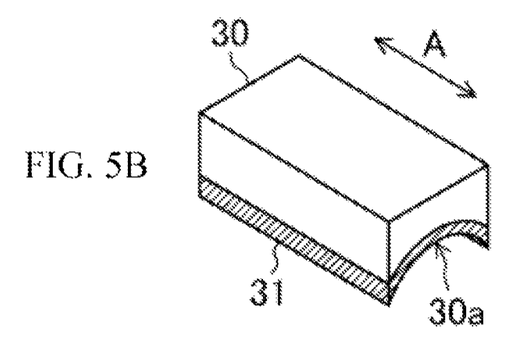
FIG. 5B is a perspective view showing a specific example of the shape of the pressing member.
Figure 5C:
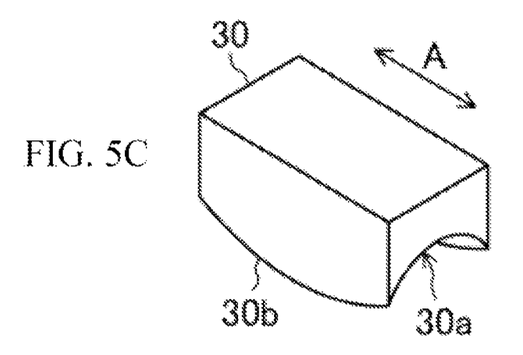
FIG. 5C is a perspective view showing a specific example of the shape of the pressing member.

In the present embodiment, the shape of the pressing member 30 is not particularly limited. FIGS. 5A to 5C are perspective views showing, as examples, the shape of the pressing member 30. In these figures, an arrow A indicates the longitudinal direction of the sealing plate 21.

As shown in FIG. 1C, the electrode body 11 is configured such that the end portions 11a, 11b of the electrode body 11 in the direction perpendicular to the winding axis direction are in a curved shape. Thus, as shown in FIG. 5A, a surface 30a, which is to contact the electrode body 11, of the pressing member 30 is preferably in a curved shape along the curved shape of the end portion 11a of the electrode body 11. With this configuration, the electrode body 11 can be stably pressed without extra stress applied to the electrode body 11.

Alternatively, as shown in FIG. 5B, the portion, which is to contact the electrode body 11, of the pressing member 30 may include an elastic body 31. With this configuration, stress applied to the electrode body 11 when the electrode body 11 is pressed by the pressing member can be reduced. As a result, e.g., cracking of the electrode plate forming the electrode body 11 can be reduced or prevented.

Of surfaces, which are to contact the electrode body 11, of the pressing member 30, surfaces 30b parallel with the longitudinal direction A of the sealing plate 21 may be in a curved shape protruding toward the electrode body 11, as shown in FIG. 5C. With this configuration, the electrode body 11 can be smoothly bent along the longitudinal direction A. As a result, e.g., cracking of the electrode plate forming the electrode body 11 can be reduced or prevented.

Variations of Present Embodiment

In the above-described embodiment, the gas discharge valve 22 provided at the sealing plate 21 is at the position apart from the center portion of the sealing plate 21 for avoiding contact with the pressing member 30 arranged at the center portion of the electrode body 11, as shown in FIGS. 1A and 1B.

However, for quickly discharging gas from the battery case 20 to the outside of the battery, the gas discharge valve 22 is preferably provided at the position at which the gas discharge path is shortest, i.e., the center portion of the sealing plate 21.

Figure 6A:
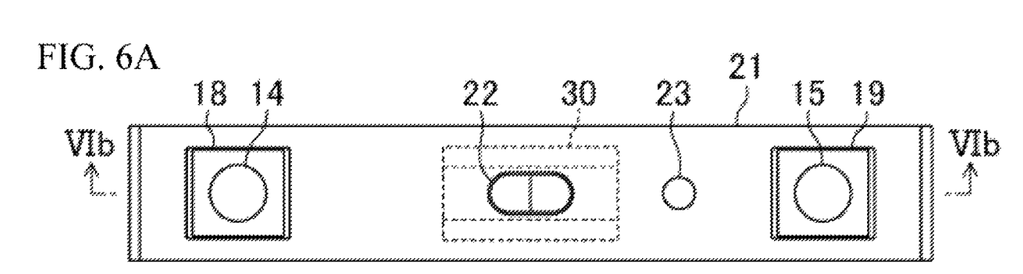
FIG. 6A is a plan view of a rectangular secondary battery.
Figure 6B:
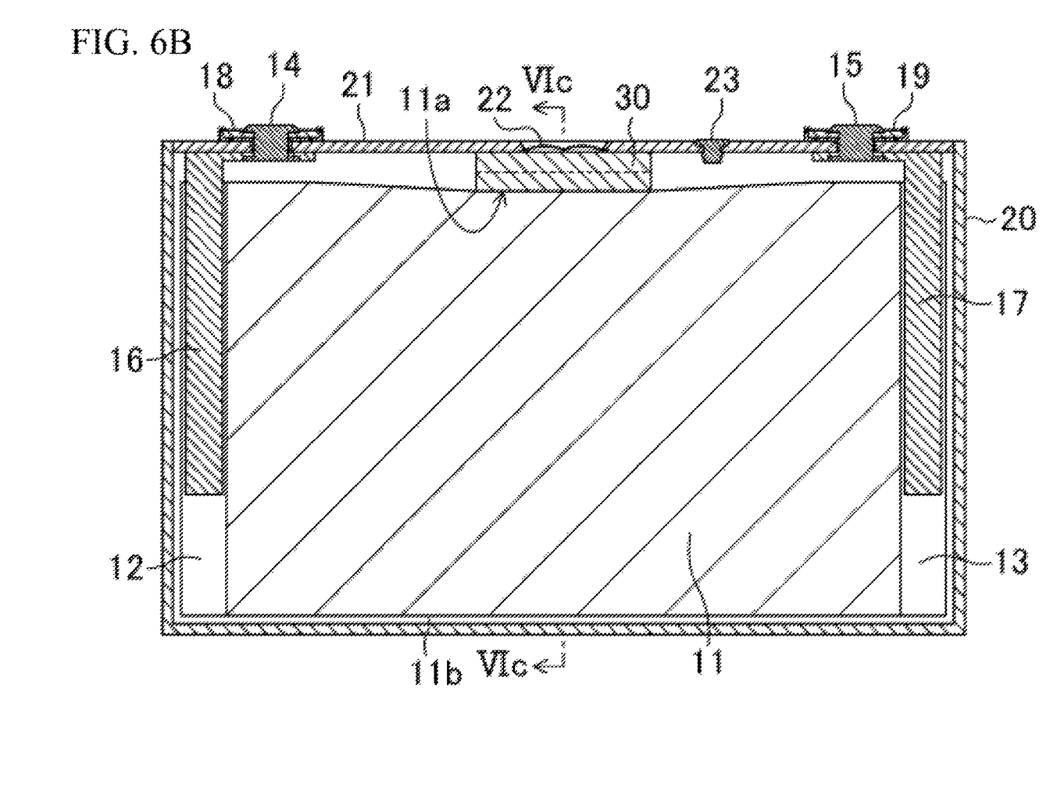
FIG. 6B is a sectional view along a VIb-VIb line of FIG. 6A.
Figure 6C:
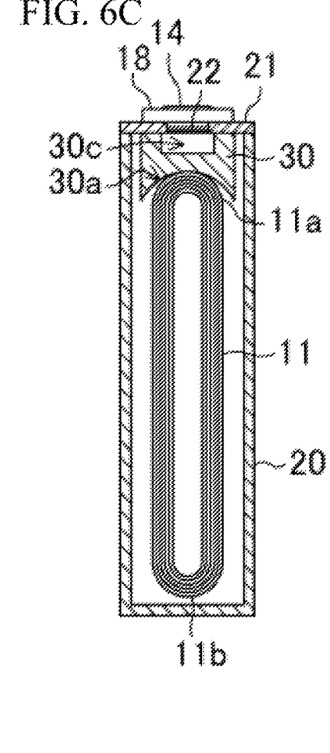
FIG. 6C is a sectional view along a VIc-VIc line of FIG. 6B.
Figure 6D:
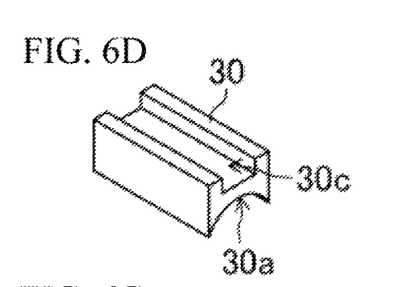
FIG. 6D is a perspective view of a pressing member.

FIGS. 6A to 6D are views showing a variation of a rectangular secondary battery configured such that a gas discharge valve 22 is provided at a center portion of a sealing plate 21. FIG. 6A is a plan view of the rectangular secondary battery, FIG. 6B is a sectional view along a VIb-VIb line of FIG. 6A, FIG. 6C is a sectional view along a VIc-VIc line of FIG. 6B, and FIG. 6D is a perspective view of a pressing member 30.

As shown in FIGS. 6A and 6B, the gas discharge valve 22 is provided at the center portion of the sealing plate 21. Moreover, the pressing member 30 is arranged at a center portion of an electrode body 11 as in that shown in FIGS. 1A and 1B. As shown in FIGS. 6C and 6D, the pressing member 30 is, on the side contacting the sealing plate 21, formed with a groove 30c along the longitudinal direction of the sealing plate 21 such that the groove 30c overlaps with the gas discharge valve 22 as viewed in plane. That is, the pressing member 30 is arranged at such a position that the pressing member 30 does not contact the gas discharge valve 22. With this configuration, gas accumulated in a battery case 20 is quickly discharged to the outside of the battery through the gas discharge valve 22 by way of the groove 30c.

Figure 7A:
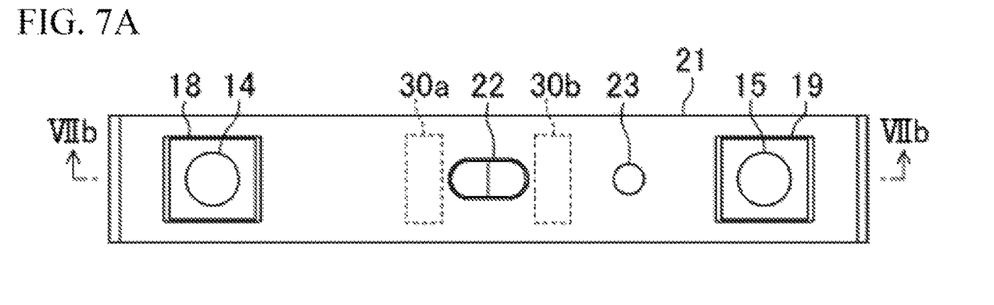
FIG. 7A is a plan view of a rectangular secondary battery.
Figure 7B:
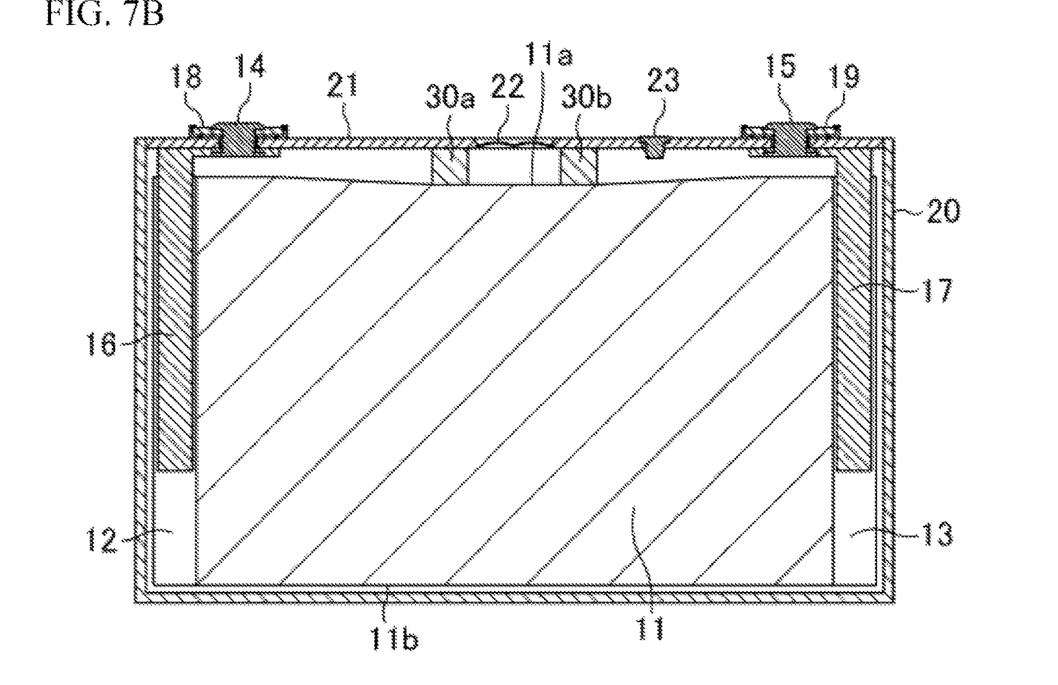
FIG. 7B is a sectional view along a VIb-VIIb line of FIG. 7A.

FIGS. 7A and 7B are views showing another variation of the rectangular secondary battery configured such that the gas discharge valve 22 is provided at the center portion of the sealing plate 21. FIG. 7A is a plan view of the rectangular secondary battery, and FIG. 7B is a sectional view along a VIIb-VIb line of FIG. 7A.

As shown in FIGS. 7A and 7B, the gas discharge valve 22 is provided at the center portion of the sealing plate 21. Moreover, a pair of pressing members 30a, 30b is, as viewed in plane, arranged between the sealing plate 21 and the electrode body 11 through the gas discharge valve 22. That is, the pressing members 30a, 30b are arranged at such positions that the pressing members 30a, 30b do not contact the gas discharge valve 22. With this configuration, gas accumulated in the battery case 20 is quickly discharged to the outside of the battery through the gas discharge valve 22.

Note that the pressing members 30a, 30b are not arranged at the center portion of the electrode body 11 in the present variation, but the electrode body 11 pressed by the pair of pressing members 30a, 30b is, as shown in FIG. 7B, bent in a manner substantially similar to that in the case shown in FIG. 1B. That is, the pair of pressing members 30a. 30b provides features and advantageous effects similar to those in the case where the single pressing member 30 is arranged at the center portion of the electrode body 11.

Examples

Hereinafter, examples of the present disclosure will be described. The present invention is not limited to the following examples.

(Production of Lithium Ion Secondary Battery)

A lithium ion secondary battery having the structure shown in FIGS. 1A to 1C was produced by the following steps.

A positive electrode material mixture including a positive electrode active material containing lithium-nickel-cobalt-manganese composite oxide was applied to both surfaces of a positive electrode core made of aluminum foil, and in this manner, a strip-shaped positive electrode plate was produced. A negative electrode material mixture including a negative electrode active material containing black lead was applied to both surfaces of a negative electrode core made of copper foil, and in this manner, a strip-shaped negative electrode plate was produced. The produced strip-shaped positive and negative electrode plates were wound with a polyolefin separator interposed therebetween, and in this manner, a flat electrode body 11 was produced.

Figure 8:
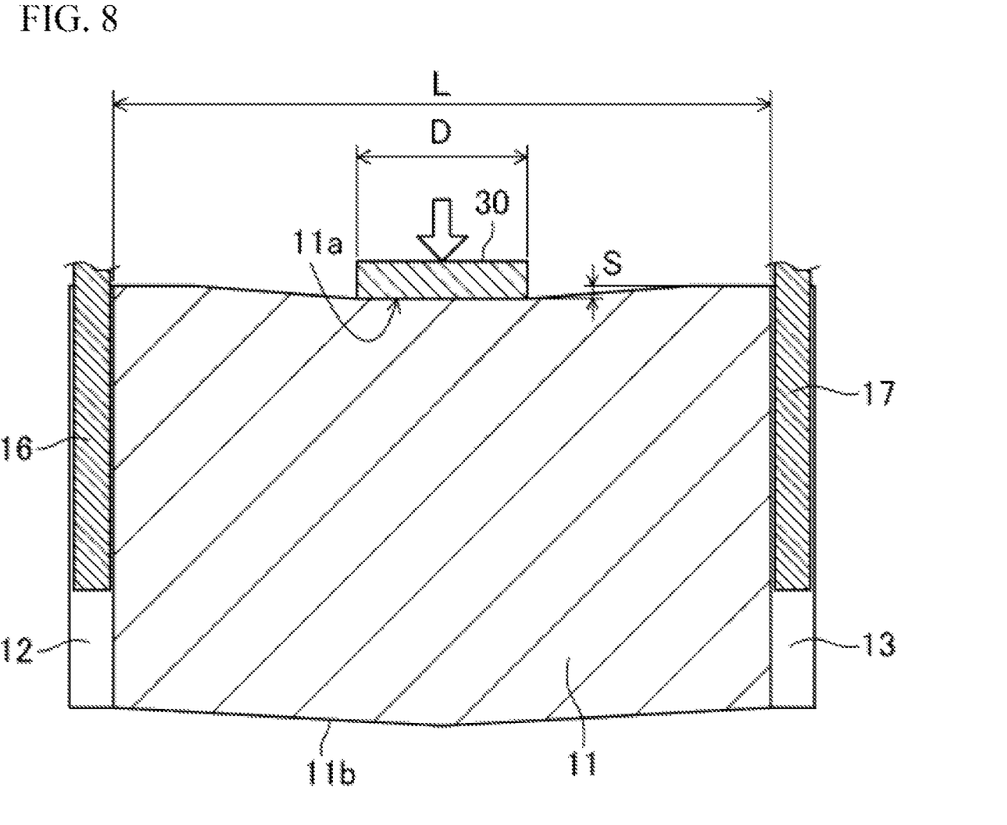
FIG. 8 is a view showing the dimensions of an electrode body and a pressing member in examples.

As shown in FIG. 8, the length L of the electrode body 11 in a winding axis direction thereof was 280 mm. The length L was the length of a region to which the active materials were applied.

A positive electrode current collector 16 made of aluminum alloy and a negative electrode current collector 17 made of copper alloy were attached to a sealing plate 21, and thereafter, the electrode body 11 was pressed and bent by a pressing member 30 by the steps shown in FIG. 3B. Thereafter, by the steps shown in FIG. 4A, the positive electrode current collector 16 and the negative electrode current collector 17 were each welded to the positive and negative electrode cores extending from end portions 12, 13 of the electrode body 11.

As shown in FIG. 8, pressing members 30 whose ratios (D/L) of the length D of the pressing member 30 to the length L of the electrode body 11 in the winding axis direction are 10%, 30%, 50%, and 70% were used as the pressing member 30. Moreover, a pressing distance S by which the electrode body 11 is pressed by the pressing member 30 was 0 mm, 0.5 mm, 1.0 mm, and 1.5 mm.

The electrode body 11 attached to the sealing plate 21 was housed in a battery case 20, and thereafter, the sealing plate 21 was welded to an edge of an opening of the battery case to seal the battery case 20. A non-aqueous electrolytic solution was injected into the battery case 20 through a solution injection hole, and thereafter, the solution injection hole was sealed with a plug. In this manner, a lithium ion secondary battery was produced. The designed capacity of the produced lithium ion secondary battery was 60 Ah.

Note that a small lithium ion battery that the length L of an electrode body 11 is 120 mm and a designed capacity is 28 Ah was also produced as a reference by a similar method.

(Evaluation of Li Deposition)

It has been known that as a result of repeated charging and discharging in a state in which gas is accumulated in the electrode body 11, excessive current concentration is caused around bubbles caused due to the gas and Li is deposited on a negative electrode plate surface due to concentration of Li ions, which can be occluded in the negative electrode active material, or more. For this reason, gas accumulation in the electrode body 11 was evaluated based on whether or not Li is deposited on the negative electrode plate surface after the charged and discharged lithium ion battery had been disassembled. A test was conducted by the following method.

The produced battery was charged with a constant current at 1.0 C until reaching 4.2 V, and subsequently, was discharged at 1.0 C until a battery voltage reaches 2.5 V. After charging and discharging, the battery was disassembled, the negative electrode plate was taken out, and the presence or absence of Li deposition was visually checked.

Table 1 shows evaluation results. Note that the same test was also conducted for the small lithium ion battery produced as a reference.

TABLE 1

| Electrode Body Length (L) | Pressing Distance (S) | Pressing Member Length Ratio (D/L) | | | |
|---|---|---|---|---|---|
| | | 10% | 30% | 50% | 70% |
| 280 mm | 0 mm | Deposited | | | |
| | 0.5 mm | Deposited | Deposited | Deposited | Deposited |
| | 1.0 mm | Not Deposited | Not Deposited | Not Deposited | Deposited |
| | 1.5 mm | Not Deposited | Not Deposited | Not Deposited | Deposited |
| 120 mm | 0 mm | Not Deposited | | | |

As shown in Table 1, Li deposition was observed on the negative electrode plate surface in the battery (the pressing distance S is 0 mm) in which the electrode body 11 is not pressed by the pressing member 30. Moreover, Li deposition was also observed in the battery with a pressing distance S of 0.5 mm.

On the other hand, in the batteries with a pressing distance S of 1.0 mm and 1.5 mm, Li deposition was observed in the case where the ratio (D/L) of the length of the pressing member 30 is 70%, but no Li deposition was observed in the case where the ratio (D/L) of the length of the pressing member 30 is 50% or less.

In the small lithium ion battery produced as a reference, no Li deposition was observed even without pressing of the electrode body 11 by the pressing member 30.

The above-described results show that the small lithium ion battery having a short length of the electrode body 11 and a small capacity does not show the phenomenon that Li is deposited on the negative electrode plate surface, but gas tends to be accumulated in the electrode body 11 in the size-increased lithium ion battery having a long length of the electrode body 11 and a great capacity and such a lithium ion battery prominently shows the phenomenon that Li is deposited on the negative electrode plate surface.

The results also show that in such a size-increased lithium ion battery, the electrode body 11 is bent by the pressing member 30 so that gas accumulation in the electrode body 11 can be reduced and Li deposition on the negative electrode plate can be reduced accordingly.

Note that in a case where the ratio (D/L) of the length of the pressing member 30 is 70% or more, bending of the electrode body 11 is insufficient and the feature and advantageous effect of forcibly discharging gas generated in the electrode body 11 toward the end portions of the electrode body 11 are not provided. Thus, for providing these feature and advantageous effect, the ratio (D/L) of the length of the pressing member 30 is preferably equal to or less than 50% (equal to or less than ½) and more preferably equal to or less than 30%.

In a case where the pressing distance S by which the electrode body 11 is pressed by the pressing member 30 is short, bending of the electrode body 11 is insufficient, and similar feature and advantageous effect are not provided. Thus, for providing these feature and advantageous effect, the pressing distance S of the electrode body 11 is preferably equal to or greater than 1.0 mm. Note that in the case of an extremely-long pressing distance S, e.g., cracking of the electrode plate forming the electrode body 11 might be caused. For this reason, the pressing distance S of the electrode body 11 is preferably equal to or less than 5 mm.

The present disclosure has been described with reference to the preferred embodiments, but such description does not limit the present disclosure. Needless to say, various modifications can be made.

DESCRIPTION OF REFERENCE CHARACTERS

10 Rectangular Secondary Battery
11 Electrode Body
12 End Portion of Electrode Body (Positive Electrode Core)
13 End Portion of Electrode Body (Negative Electrode Core)
14, 15 External Terminal
16 Current Collector (Positive Electrode Current Collector)
17 Current Collector (Negative Electrode Current Collector)
20 Battery Case
21 Sealing Plate
22 Gas Discharge Valve
23 Plug
30 Pressing Member
31 Elastic Body

The invention claimed is:

1. A rectangular secondary battery comprising:
a flat electrode body configured such that a positive electrode plate and a negative electrode plate are wound with a separator interposed therebetween;
a rectangular battery case having an opening and housing the electrode body; and
a sealing plate sealing the opening,
wherein the electrode body is housed in the battery case such that a winding axis of the electrode body is parallel with a longitudinal direction of the sealing plate,
at an end portion of the electrode body in a winding axis direction thereof, an edge of the positive or negative electrode plate is connected to an external terminal fixed to the sealing plate through a current collector,
an insulating pressing member contacting the sealing plate and the electrode body is arranged between the sealing plate and the electrode body,
the pressing member is configured to press a portion of the electrode body in a direction perpendicular to the winding axis of the electrode body thereby maintaining said portion in a bent state such that a distance between said portion of the electrode body contacting the pressing member and the sealing plate is longer than a distance between the end portion of the electrode body in the winding axis direction thereof and the sealing plate, and
wherein the pressing member is located only on an end portion of the electrode body facing the sealing plate and along an adjacent curved shape of the end portion of the electrode body.

2. The rectangular secondary battery of claim 1, wherein the pressing member is made of resin.

3. The rectangular secondary battery of claim 1, wherein a portion of the pressing member contacting the electrode body includes an elastic body.

4. The rectangular secondary battery of claim 1, wherein the electrode body is configured such that an end portion of the electrode body in a direction perpendicular to the winding axis direction of the electrode body is in a curved shape, and
a surface of the pressing member contacting the electrode body is in a curved shape along the curved shape of the end portion of the electrode body.

5. The rectangular secondary battery of claim 1, wherein the sealing plate is provided with a gas discharge valve, and
the pressing member is arranged at a position at which the pressing member does not contact with the gas discharge valve.

6. The rectangular secondary battery of claim 1, wherein the pressing member is arranged at a center portion of the electrode body in the winding axis direction thereof, and
a length of the pressing member in the winding axis direction of the electrode body is equal to or less than ½ of a length of the electrode body in the winding axis direction thereof.

* * * * *